United States Patent
Ludwig et al.

(10) Patent No.: US 7,201,436 B2
(45) Date of Patent: Apr. 10, 2007

(54) COMPOSITE COMPONENT, IN PARTICULAR, A CAR BODY ATTACHMENT PART FOR A MOTOR VEHICLE

(75) Inventors: Matthias Ludwig, Vechelde (DE); Marcus Lutz, Gifhorn (DE); Frank Niebuhr, Wilsche (DE); Tobias Niesner, Gifhorn (DE); Harald Batke, Dalldorf (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 11/223,632

(22) Filed: Sep. 9, 2005

(65) Prior Publication Data

US 2006/0055210 A1     Mar. 16, 2006

(30) Foreign Application Priority Data

Sep. 13, 2004   (DE) .................. 10 2004 044 159

(51) Int. Cl.
*B60J 7/00*     (2006.01)
(52) U.S. Cl. ............................................... 296/210
(58) Field of Classification Search ........... 296/210, 296/183.1, 181.2, 901.01
See application file for complete search history.

(56) References Cited

U.S. PATENT DOCUMENTS

| 4,153,657 | A | * | 5/1979 | Wilcox | 264/46.6 |
| 4,432,478 | A | * | 2/1984 | Bott | 224/321 |
| 5,575,527 | A | * | 11/1996 | Pfister | 296/210 |
| 5,624,266 | A | * | 4/1997 | Gibbs et al. | 224/315 |
| 6,197,140 | B1 | | 3/2001 | Havens | |
| 6,345,859 | B1 | * | 2/2002 | Thomas | 296/216.08 |
| 6,568,748 | B2 | * | 5/2003 | Yoon | 296/210 |
| 6,695,397 | B2 | * | 2/2004 | Kamiya et al. | 296/210 |
| 6,742,836 | B2 | * | 6/2004 | Hock et al. | 296/210 |
| 6,899,381 | B1 | * | 5/2005 | Fero et al. | 296/214 |
| 6,938,946 | B2 | * | 9/2005 | Hock et al. | 296/210 |
| 6,945,592 | B1 | * | 9/2005 | Hui et al. | 296/210 |
| 2005/0189793 | A1 | * | 9/2005 | Wato et al. | 296/210 |

FOREIGN PATENT DOCUMENTS

| DE | 41 37 707 | 5/1993 |
| DE | 100 28 320 | 12/2001 |
| EP | 1 342 649 | 9/2003 |

OTHER PUBLICATIONS

European Search Report, Feb. 14, 2006.

* cited by examiner

Primary Examiner—Kiran B. Patel
(74) Attorney, Agent, or Firm—Carlson, Gaskey & Olds

(57) ABSTRACT

The invention relates to a composite component and a method of producing such composite component, in particular a car body attachment part for a motor vehicle, which includes an outer skin that is defined by an outer skin foil associated with the motor vehicle. An inner layer made of plastic is applied to a rear side of the outer skin foil by providing a foamed or injection-molded backing. A mounting piece is disposed in a depression of the outer skin foil and is anchored therein. An intermediate foil is situated between the mounting piece and the outer skin foil and prevents, at least in sections, any direct contact between the mounting piece and the outer skin foil.

14 Claims, 3 Drawing Sheets

COMPOSITE COMPONENT, IN PARTICULAR, A CAR BODY ATTACHMENT PART FOR A MOTOR VEHICLE

BACKGROUND OF THE INVENTION

The application claims priority to German Application No. 10 2004 044 159.6, which was filed on Sep. 13, 2004.

The invention relates to a composite component, in particular a composite component forming car body attachment part for a motor vehicle that includes an outer skin foil and a mounting piece anchored in a depression of the outer skin foil.

Car body attachment parts for a motor vehicle are those parts that are attached to the car body, and which define a visible outer skin of the motor vehicle in the readily mounted state, at least in sections, and that are visible from the outside. Car body attachment parts may be flaps (doors, lids), bumpers or roof modules, the latter also including roof modules with or without roof opening systems.

It is already known to produce composite components with an exterior plastic foil, which is preferably dyed throughout and serves as the outer skin of the composite component. A rear side of an outer skin foil is provided with a foamed or injection-molded backing, made from a polyurethane (PU) material for example, which is reinforced with glass fibers. If attachment parts are to be fastened to the composite component of a vehicle, such as a cover of a spoiler roof of a roof module, there is the need for mounting pieces such as guide rails, for example. Guide rails are known that are disposed in a depression of the outer skin foil, and which are anchored therein by an interlocking fit. Due to the differing properties of the material of the guide rails, or more generally, of the mounting pieces and the outer skin foil with the foamed backing, undesirable noise could occur such as groaning or squeaking. Vehicle occupants regard these noises as a nuisance that adversely affects ride quality and comfort.

It is therefore the object of the invention to provide a composite component, which allows the integration of mounting pieces with low expenditure, and without an undesired, irritating side noise occurring with external loadings.

SUMMARY OF THE INVENTION

The subject invention provides a composite component with an intermediate foil that is situated between a mounting piece and an outer skin foil. The intermediate foil prevents, at least in sections, any direct contact between the mounting piece and the outer skin foil. The advantages achieved with the invention lie in particular in the fact that the intermediate foil serves as a buffer or sliding layer during relative motion between components. This relative motion occurs as a result of different flexural and torsional elasticity modules of the outer skin foil, provided with a foamed or injection-molded backing, and of the mounting piece. By serving as a buffer or sliding layer, the intermediate foil prevents any undesirable, irritating side noise generated by unfavorable frictional pairings.

The mounting piece is preferably surrounded by the outer skin foil at least in sections and thereby is anchored in a depression in the outer skin foil by an interlocking and/or frictional fit. The pressure from plastic material, which builds up during foaming/injection-molding of an inner layer on the outer skin foil, has the effect to press the outer skin foil firmly against the mounting piece. This deforms the mounting piece in the process in such a manner that the mounting piece is received in the outer skin foil by an interlocking or frictional fit.

The mounting piece is preferably provided with at least one anchoring projection on at least one side wall. This provides a form-fitting anchoring of the mounting piece in the outer skin foil.

During the process of foaming/injection-molding the inner layer, it is preferred that the plastic material firmly presses the outer skin foil and the intermediate foil against the mounting piece and the anchoring projection. This forms a corresponding depression in the outer skin foil and the intermediate foil.

The mounting piece is preferably a rail. In one example, the rail is an aluminum rail and may be a guide rail for the cover of a spoiler roof. Spoiler roofs are vehicle roofs in which the movable cover is shifted to lie above an outer skin of the vehicle.

The composite component according to the invention may be a roof module of a vehicle. The mounting piece then provides a simple way of fastening any attachment parts that may be attached to the roof module.

According to a preferred embodiment, the mounting piece is accessible from outside through an opening on the outside that is not covered by the outer skin foil and the intermediate foil. This is why the mounting piece may serve, for instance, to anchor a load support or may serve as a guide rail of a movable cover.

Further, the opening is preferably covered by a movable covering, with the possibility that the movable covering also covers an edge of the intermediate foil in the region of the mounting piece. Thus, the intermediate foil cannot be seen from the outside any more and does not impair the visual appearance of the composite component. The intermediate foil may cover the complete outer skin before the mounting piece is fastened to the outer skin. In addition, it is possible to cut and trim the intermediate foil without having to meet close dimensional tolerances before the mounting piece is fastened to the outer skin, as the edge of the intermediate foil generated by cutting or trimming will subsequently be covered by the mounting piece. The movable covering is positively attached to the mounting piece by protrusions, for instance.

The inner layer is preferably reinforced with glass fiber sections. This is preferably done by a known long fiber injection (LFI) method. The strength of the composite component is sufficient because the inner layer provides the required strength. Thus, the invention is not only applicable to roof modules, but also to hard tops, interior roof linings and other vehicular external and internal lining parts, planking components and structural components.

According to the preferred embodiment, the intermediate foil is a polyethylene (PE) foil having a material thickness of approximately 0.4 to 0.2 mm. Thus, this thickness only amounts to a fraction of that of the outer skin foil.

The method according to the invention of producing a composite component includes the following steps. An outer skin of the composite component is provided that is defined by an outer skin foil, and which is visible from outside the vehicle after manufacturing. The outer skin foil includes a depression. A mounting piece is placed in the depression with an intermediate foil being present or being positioned between the mounting piece and the adjoining outer skin foil. The intermediate foil prevents, at least in sections, any direct contact between the mounting piece and the outer skin foil. The mounting piece is placed, along with the intermediate foil and the outer skin foil, in a foaming or injection-molding mold. A foamed or injection-molded backing is applied to a rear side of the outer skin foil to produce an inner layer and, in the process, a pressure is exerted on the outer skin foil, which presses the outer skin foil against the mounting piece and firmly anchors the mounting piece in the depression.

To fasten the mounting piece to the outer skin foil, the method uses pressure, which develops during the production of the composite components as a result of the liquid plastic material (e.g. foaming pressure). Consequently, there is no need of additional method steps, resulting in lower method costs. The intermediate foil between the mounting piece and the outer skin foil is already in place, or will be placed, prior to the process of making the foamed or injection-molded backing. The intermediate foil could also be applied to one of the pieces, such as the mounting piece or outer skin foil.

In particular, the outer skin foil is made from a thermoplastic material and is plastically deformed under heating, for instance in a deep-drawing process. During deep-drawing, the outer skin foil preferably assumes the shape of the mounting piece in the region of the depression to a large extent. In this way the required depression can be produced at very favorable costs.

It is advantageous to incorporate glass fiber sections in the liquid plastic during the process of making the foamed or injection-molded backing. This provides the required strength of the composite component.

In a preferred embodiment, the intermediate foil is a protection foil, which covers at least a major portion of the outer skin foil. Preferably, the protection foil covers all of the outer skin foil. Such protection foils are advantageous because the finally visible outer skin is not damaged during the manufacture of the composite component or during transport. If necessary, the finished composite component, complete with the protection foil, can be delivered to a car manufacturer. This allows the car manufacturer to remove the protection foil immediately before mounting the composite component, so that any damages or contaminations are avoided. Thus, the protection foil is both able to ensure the protection of the composite component against damages and contaminations, and can take on the function of the intermediate foil to prevent any irritating side noise. By taking on these two functions, a second intermediate foil becomes superfluous, whereby costs are reduced to an enormous extent.

The method according to the invention preferably includes a removal of the protection foil from the outer skin foil, except in the region between the mounting piece and the outer skin foil, for instance by trimming the protection foil.

These and other features of the present invention can be best understood from the following specification and drawings, the following of which is a brief description.

DETAILED DESCRIPTION OF THE PREFERRED EMBODIMENT

Figure 1:
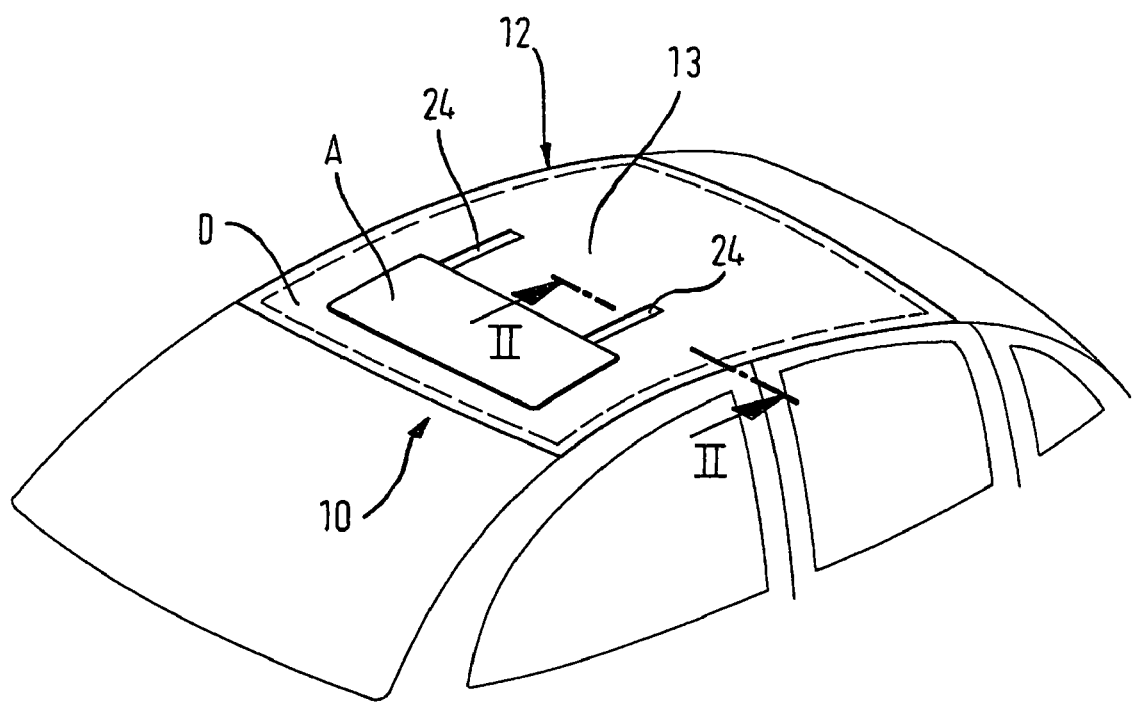
FIG. 1 is a schematic perspective view of a vehicle roof comprising a composite component produced according to the invention and provided in the form of a roof module.

FIG. 1 shows a vehicle roof 10 that can be opened. The vehicle roof 10 includes an outer skin that is defined at least in sections by a car body attachment part in the form of a composite component 12. In the example shown, the composite component 12 is the entire roof module D, however, the composite component 12 could also be a movable cover A of the vehicle roof 10. The composite component 12 could also be utilized for doors, flaps, hoods or bumpers of a vehicle, or parts of the interior lining, for example.

The vehicle roof 10 of FIG. 1 is a spoiler roof, in which the cover A can be moved to the rear and above a stationary roof portion 13 with the aid of lateral guide rails 24 that are integrated in the stationary roof portion 13.

Figure 2:
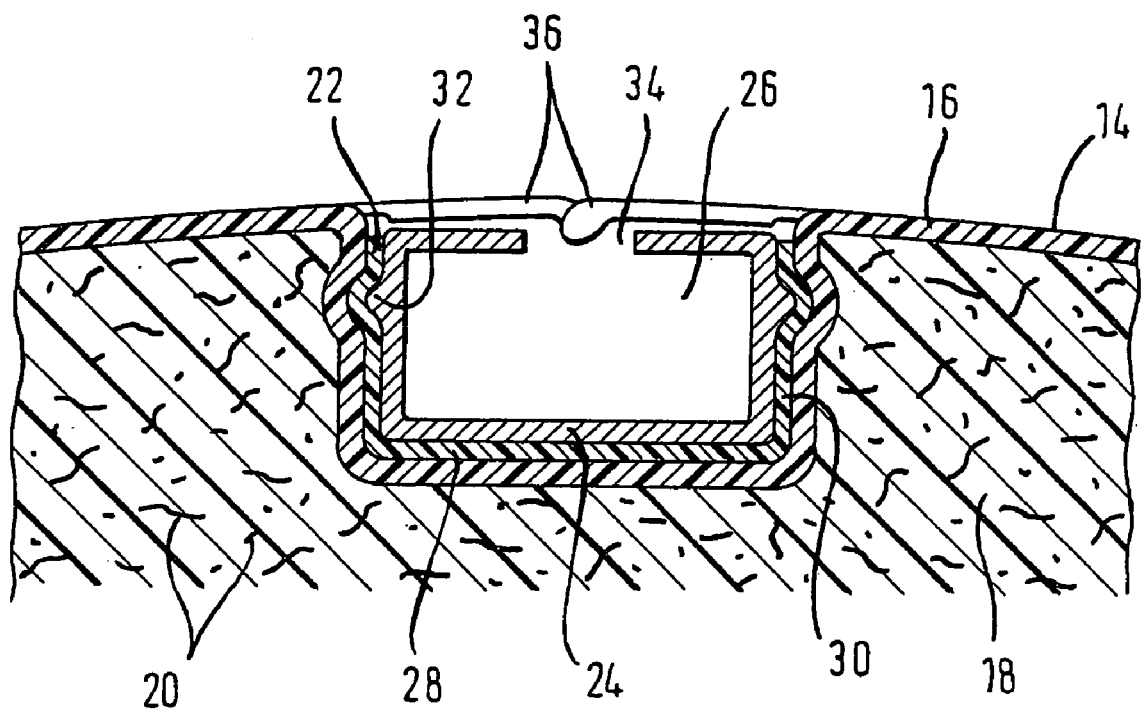
FIG. 2 is an enlarged sectional view through the composite component of FIG. 1 along line II—II.

FIG. 2 shows the composite component 12, which consists of several interconnected layers. An outer skin 14, which is visible in an installed condition, is defined by an outer skin foil 16 comprising a plastic foil with a maximum thickness of about 1.5 mm. In one example, the plastic foil is a double-layered coextrusion foil. An outer layer of the plastic foil is a hard coating layer, preferably made of polymethylmethacrylate (PMMA), which has an inner side bonded to a carrier layer that is dyed throughout, and which is preferably made from a blend of polycarbonate (PC) and acrylonitrile-styrene-acrylate copolymer (ASA). The hard coating layer has a thickness of only approximately 0.4 mm and may be transparent or likewise be dyed throughout. The distinct layers are not separately illustrated. Due to the layers being dyed throughout, an external lacquering may be omitted.

An inner or rear side of the outer skin foil 16 is provided with a foamed or injection-molded backing, which produces an inner layer 18. The inner layer 18 is comprised of PU material into which glass fiber sections 20 are introduced to be provided inordinate therein. The inner layer 18 is preferably produced by the long fiber injection (LFI) method.

At least in sections in the region of the guide rail 24, there is arranged a thin intermediate foil 22 between the outer skin foil 16 and the guide rail 24, which represents a mounting piece. The intermediate foil 22 has a thickness, which only amounts to a fraction of that of the outer skin foil 16 that defines the outer skin 14 in sections, and has been drawn in the Figures disproportionately thick for clarity purposes.

Arranged in a depression 26 of the outer skin foil 16 is the guide rail 24, having a base 28 and two side walls 30. The guide rail 24 is made from an extruded aluminum profile with a rectangular cross-section open at the top. The side walls 30 of the guide rail 24 are provided with at least one lateral anchoring projection 32.

The guide rail 24 has an opening 34 at the top. This opening 34 is closed by a covering 36. The covering 36 is formed as a separate component and does not protrude beyond an envelope of the outer skin 14. The covering 36 is preferably made from plastic, and thus is very light-weight. The covering 36 is configured in two pieces, so that a glider (not shown) engaging the guide rail 24 can displace the covering 36 in sections, to expose the opening 34. Upper edges of the intermediate foil 22 are completely covered towards the outside by the covering 36.

The guide rail 24 has a flexural and torsional elasticity that differs from that of the unit of outer skin foil 16 and inner layer 18. For that reason, an irritating side noise could occur during heavy loading, and an elastic deformation of the roof module could occur if the intermediate foil 22 is not employed.

Figure 3:
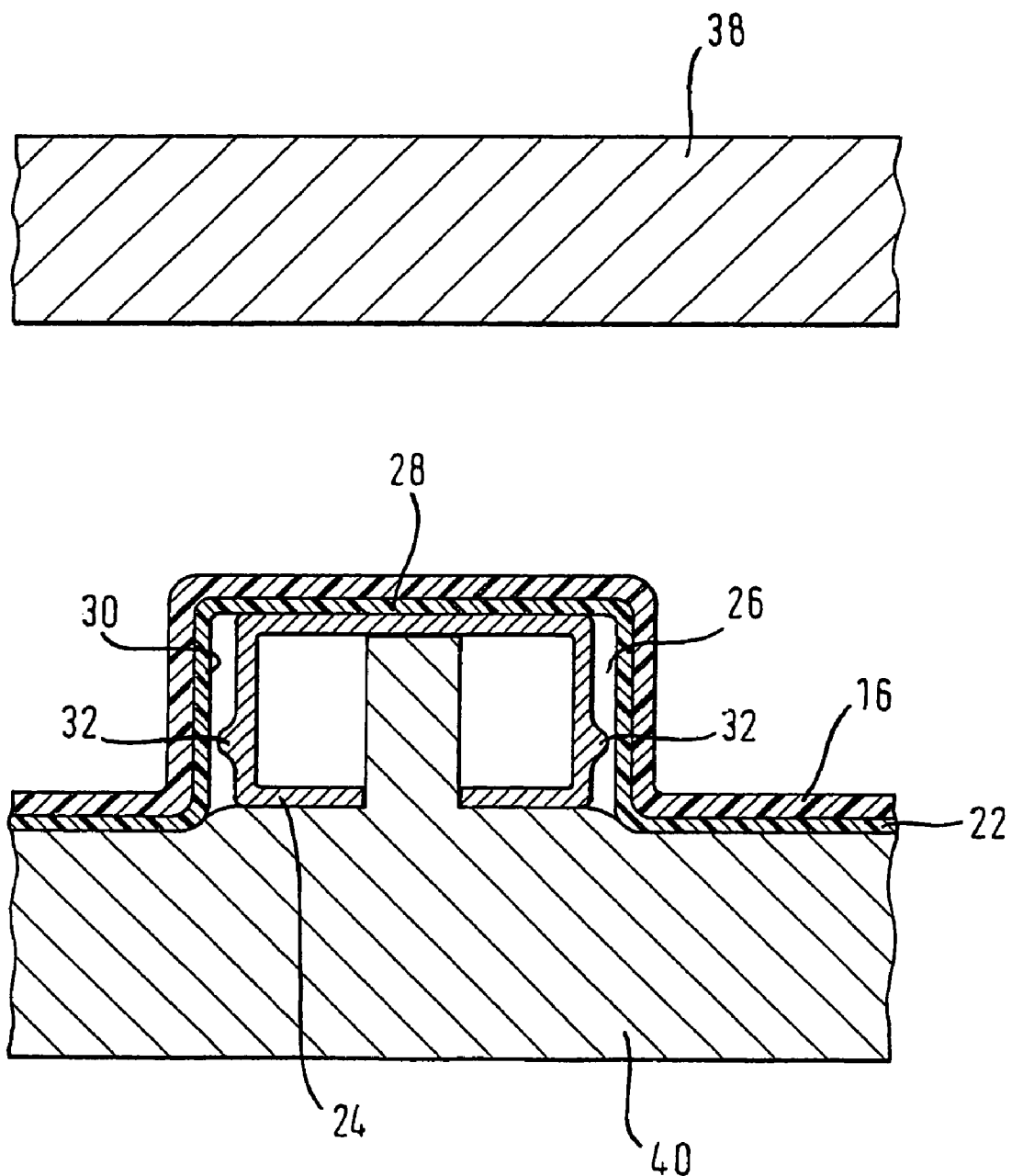
FIG. 3 is an enlarged sectional view through the composite component of FIG. 1 in the foaming or injection-molding tool and prior to the foaming or injection-molding process.

The method of producing the composite component 12 is described with reference to FIG. 3. The outer skin foil 16 and the intermediate foil 22 are usually fully delivered as a unit in large coils or sheets, with the intermediate foil 22 completely covering a surface area of the outer skin foil 16. This is the surface area that is visible after the process of applying the foamed backing.

At first, the outer skin foil 16 along with the intermediate foil 22 is plastically deformed, preferably by deep-drawing, in order to form a curvature and the depression 26. The guide rail 24 is placed in this depression 26. The intermediate foil 22 is positioned between the guide rail 24 and the adjoining outer skin foil 16 in such a manner that any direct contact between the guide rail 24 and the outer skin foil 16 is prevented. The guide rail 24 is placed in a foaming or injection-molding mold along with the intermediate foil 22 and the outer skin foil 16, with a web of a lower part 40 of the foaming or injection-molding mold projecting into an interior space of the guide rail 24.

Subsequently, the rear side of the outer skin foil 16 is provided with a foamed or injection-molded backing to form the inner layer 18 (FIG. 2). It is due to the foaming pressure that the outer skin foil 16 is firmly pressed against the guide rail 24 in a lateral direction. The guide rail, however, does not yield or minimally yields due to the guide rail's strength, and due to the support by the web of the lower part 40 of the foaming or injection-molding mold. The outer skin foil 16, however, is plastically deformed thereby, and indentations will be formed in the intermediate foil 22 and the outer skin foil 16 that are complementary to the anchoring projections 32, as shown in FIG. 2. A form-fitting and force-fitting connection is thus ensured between the guide rail 24 and the unit of outer skin foil 16 and inner layer 18. The glass fiber sections 20 will be injected during the production of the foamed or injection-molded backing.

After foaming, and when the reaction of the plastic material is finished, an upper part 38 of the foaming or injection-molding mold moves upwards. The resultant composite component 12 is taken out from the foaming or injection-molding mold. As the intermediate foil 22 has been applied across the entire surface area, the intermediate foil 22 can now be removed in those areas that are not adjacent to the guide rail 24 and will not be needed any longer. This can be done, for instance, by cutting or trimming the intermediate foil 22 off along an upper edge of the guide rail 24.

As an alternative, the intermediate foil 22 could only cover portions of the outer skin foil 16, or could be provided only on a lower side and side surfaces of the guide rail 24 prior to embedding the guide rail 24 in the depression 26.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A composite component for a car body attachment part for a motor vehicle comprising:
    an outer skin that is defined by an outer skin foil associated with a vehicle;
    an inner layer made of plastic and applied to a rear side of the outer skin foil by a foamed or injection-molded backing;
    a mounting piece disposed in a depression of the outer skin foil and anchored therein; and
    an intermediate foil situated between the mounting piece and the outer skin foil that prevents, at least in sections, any direct contact between the mounting piece and the outer skin foil.

2. The composite component according to claim 1 wherein the mounting piece is surrounded by the outer skin foil at least in sections and is anchored in the depression by at least one of an interlocking and frictional fit.

3. The composite component according to claim 1 wherein the mounting piece is provided with at least one anchoring projection on at least one side wall.

4. The composite component according to claim 3 wherein the at least one anchoring projection is received in a respective depression of the outer skin foil.

5. The composite component according to claim 1 wherein the inner layer firmly presses the outer skin foil and the intermediate foil against the mounting piece in a region of the depression.

6. The composite component according to claim 1 wherein the mounting piece is a rail made from aluminum.

7. The composite component according to claim 6 wherein the rail is a guide rail for a cover of a spoiler roof.

8. The composite component according to claim 1 wherein the composite component is a roof module of a motor vehicle.

9. The composite component according to claim 1 wherein the mounting piece is accessible from outside through an opening facing the outside and which is not covered by the outer skin foil and the intermediate foil.

10. The composite component according to claim 9 wherein the opening is covered by a movable covering.

11. The composite component according to claim 10 wherein the movable covering covers an edge of the intermediate foil in a region of the mounting piece.

12. The composite component according to claim 10 wherein the movable covering is attached to the mounting piece by protrusions.

13. The composite component according to claim 1 wherein the inner layer is reinforced with glass fiber sections.

14. The composite component according to claim 1 wherein the intermediate foil is a polyethylene foil.

* * * * *